Patented June 3, 1930

1,761,738

UNITED STATES PATENT OFFICE

CHARLES F. MILLER, OF ANDERSON, INDIANA

PASTRY RECIPE

No Drawing. Application filed October 29, 1926. Serial No. 145,104.

This invention relates to pastries.

An object of this invention is to provide a stock sponge, suitable for using as a base for making dough for any sweet goods line, such as doughnuts, rolls, buns, coffee cake, cinnamon cake and the like.

A further object of this invention is to provide a base of this character which is universally adaptable to all such types of confection, and which may be kept for several weeks to be selectively used in making said confections.

A further object of this invention is to provide a base of this character, of simple ingredients, simple mixture and, generally, to provide an improved sponge base.

A further object of this invention is to provide an improved method of treating the elements of the sponge, and to provide an improved means of using the sponge in making doughnuts.

A further object of this invention is to provide an improved mixture and method of making doughnuts.

With the foregoing and other objects in view I have invented the mixtures and method as follows:

I first take twenty-five pounds of pure lard, twenty-five pounds of pure cane sugar, four dozen eggs, and one peck of Irish potatoes.

I separate the egg yolks from the egg whites, and beat the whites till light, then beat the yolks.

I cook the potatoes soft, then beat them till creamy; the egg yolks, the egg whites and the potatoes being separately beaten.

I then mix the egg whites, the egg yolks and the potatoes, and beat all together; and to these I add the 25 lbs. cane sugar and the 24 lbs. lard, then mix all together till creamy.

This forms a sponge which will keep for a week or two if kept in a cool place.

In making doughnuts I now take three quarts of milk, three quarts of water, three quarts of the aforesaid sponge, one-quarter pint of salt, one-half pound of yeast, preferably Fleischmann's yeast, and fifteen quarts of flour,—preferably soft winter-wheat flour.

I heat the said milk and water to almost the boiling point, and to this I add while hot, the three quarts of this sponge mixture, then mix these together, then strain through a sieve; and to this strained liquid I add the one-half pound of yeast, the one-quarter pint of salt, and four quarts of the flour. I then mix these together and let rise for twenty minutes. I then add the remainder of the flour, which will make a stiff dough, easy to work; this I let rise twenty minutes in a warmproof box.

I then roll the dough about one-eighth inch thick, then push the dough back until about one-half inch in thickness, and cut with the usual 2¾-inch doughnut cutter. I then let rise on a greased pan, and fry in deep lard till brown, then glaze in XXXX powdered sugar, flavored with vanilla. This makes thirty dozen doughnuts.

In making the glaze I use two quarts of cold water, or milk, and ten pounds of powdered sugar, adding the water or milk to the sugar and mixing till smooth, then adding two table spoonfuls of vanilla and one table spoonful of cream of tartar, if desired.

The sponge is suitable for use in making the above described doughnuts or anything in the sweet goods line, such as rolls, buns, coffee cake, cinnamon cake, and the like.

Claims:

1. A self-preserving stock sponge for forming a base for confections consisting of the following ingredients in approximately the proportions specified, Irish potatoes one peck, lard twenty-five pounds, sugar twenty-five pounds, and eggs four dozen, the potatoes being first cooked until soft and beaten into a creamy mass, and the lard, sugar and eggs thoroughly intermingled therewith.

2. The method of forming a self-preserving stock sponge for forming a base for confections consisting of separating the whites and yolks of four dozen eggs, beating the whites and yolks separately, cooking one peck Irish potatoes until soft and beating the cooked potatoes until creamy, mixing the egg whites and yolks with the potatoes, and finally adding twenty-five pounds of sugar and twenty-five pounds of lard to the mixed potatoes and eggs and beating the resulting mixture until creamy, the quantities specified being indicative of the proportions of the respective ingredients.

In testimony whereof I affix my signature.

CHARLES F. MILLER.